United States Patent
Na

(10) Patent No.: US 10,298,688 B2
(45) Date of Patent: May 21, 2019

(54) CLOUD STORAGE MANAGING SYSTEM, CLOUD STORAGE MANAGING METHOD, AND APPARATUS FOR SAME

(71) Applicant: SK techx Co., Ltd., Seoul (KR)

(72) Inventor: Seung-Won Na, Seoul (KR)

(73) Assignee: SK TECHX CO., LTD., Seoul (KR)

( * ) Notice: Subject to any disclaimer, the term of this patent is extended or adjusted under 35 U.S.C. 154(b) by 545 days.

(21) Appl. No.: 14/894,722

(22) PCT Filed: Dec. 26, 2013

(86) PCT No.: PCT/KR2013/012186
§ 371 (c)(1),
(2) Date: Nov. 30, 2015

(87) PCT Pub. No.: WO2014/196710
PCT Pub. Date: Dec. 11, 2014

(65) Prior Publication Data
US 2016/0127469 A1    May 5, 2016

(30) Foreign Application Priority Data

Jun. 7, 2013   (KR) .................. 10-2013-0065394

(51) Int. Cl.
*H04L 29/08*   (2006.01)
*G06F 3/06*    (2006.01)

(52) U.S. Cl.
CPC .......... *H04L 67/1097* (2013.01); *G06F 3/067* (2013.01); *G06F 3/0608* (2013.01);
(Continued)

(58) Field of Classification Search
CPC ................................................. H04L 67/1097
See application file for complete search history.

(56) References Cited

U.S. PATENT DOCUMENTS

| | | | |
|---|---|---|---|
| 2004/0111485 A1* | 6/2004 | Mimatsu | G06F 3/0605 709/213 |
| 2009/0228655 A1* | 9/2009 | Yamane | G06F 3/0611 711/117 |

(Continued)

FOREIGN PATENT DOCUMENTS

| | | |
|---|---|---|
| KR | 1020070105487 A | 10/2007 |
| KR | 1020090021608 A | 3/2009 |

(Continued)

OTHER PUBLICATIONS

International Search Report dated Apr. 1, 2014 for PCT/KR2013/012186, citing the above reference(s).

*Primary Examiner* — Angela Nguyen
(74) *Attorney, Agent, or Firm* — Brinks Gilson & Lione

(57) ABSTRACT

Disclosed are a cloud storage managing system, a cloud storage managing method, and an apparatus for same. To achieve the objective according to the present invention, the cloud storage managing apparatus according to the present invention comprises: a content alignment unit for aligning and shifting content recorded on a cloud storage, by transmitting a shift signal to the cloud storage; and a broker application programming interface (API) providing unit for abstracting, into a broker API, a storage API which corresponds to the type of the cloud storage by using an API mapping table, and providing the content to a terminal device by using the broker API.

12 Claims, 14 Drawing Sheets

(52) U.S. Cl.
CPC .......... *G06F 3/0616* (2013.01); *G06F 3/0631* (2013.01); *H04L 67/2809* (2013.01); *H04L 67/2852* (2013.01)

(56) References Cited

U.S. PATENT DOCUMENTS

2010/0325199 A1* 12/2010 Park .................. G06F 17/30067
  709/203
2012/0059926 A1   3/2012 Jung et al.
2012/0259901 A1  10/2012 Lee et al.
2013/0007091 A1*  1/2013 Rao .................. G06F 17/30212
  709/201

FOREIGN PATENT DOCUMENTS

| KR | 1020100092850 A | 8/2010  |
|----|-----------------|---------|
| KR | 1020100120905 A | 11/2010 |
| KR | 1020100137323 A | 12/2010 |
| KR | 1020110024808 A | 3/2011  |
| KR | 1020120111403 A | 10/2012 |
| WO | 03062979 A2     | 7/2003  |

* cited by examiner

| | 121 STORAGE API | | | 122 STORAGE API | | | 123 STORAGE API | | |
|---|---|---|---|---|---|---|---|---|---|
| | T1S1 METHOD | T1S2 METHOD | T1S3 METHOD | T2S1 METHOD | T2S2 METHOD | T2S3 METHOD | T3S1 METHOD | T3S2 METHOD | T3S3 METHOD |
| B1 METHOD | ▓ | | | | | | | | |
| B2 METHOD | | ▓ | | | | | | | |
| 130 BROKER B3 METHOD API | | | ▓ | ▓ | | | | | |
| B4 METHOD | | | | | ▓ | ▓ | | | ▓ |
| B5 METHOD | | | | | | | ▓ | | |

FIG. 2

| CONTENT UPLOADER | IDENTIFIER |
|---|---|
| FIRST CONTENT UPLOADER | A |
| SECOND CONTENT UPLOADER | B |
| THIRD CONTENT UPLOADER | C |

CLOUD STORAGE MANAGING SYSTEM, CLOUD STORAGE MANAGING METHOD, AND APPARATUS FOR SAME

CROSS REFERENCE TO RELATED APPLICATION

This application claims the benefit of Korean Patent Application No. 10-2013-0065394, filed Jun. 7, 2013, in the Korean Patent and Trademark Office. Further, this application is the U.S. National Phase Filing of International Application No. PCT/KR2013/012186 filed on Dec. 26, 2013, which is hereby incorporated by reference in its entirety into this application.

TECHNICAL FIELD

The present invention generally relates to a cloud storage management system and a cloud storage management method and apparatus and, more particularly, to a storage management system and a storage management method and apparatus, which align pieces of content in storages depending on the additional installation of cloud storage, and update a broker Application Programming Interface (API).

BACKGROUND ART

A cloud computing service is a service allowing a user to store content in cloud storage on the Internet, rather than local storage, thus enabling the user to access the cloud storage and freely use the content stored therein at anytime and anywhere using an Internet accessible device.

In accordance with a conventional cloud storage management method, as the amount of content to be recorded increases, new storage is additionally connected to existing storage via a gateway. In this case, a case may frequently occur where the function of the additionally connected cloud storage is limited to the range of the function of the existing storage. In a cloud computing service in which the additional installation of storage is essentially required, the limitation of the function of the additionally installed cloud storage is an important factor.

Korean Patent Application Publication No. 10-2009-0021608 relates to a method and system for managing server performance, and discloses technology for generating in time reports on the performance of servers and the current usage status of the servers so as to optimize the performance of various types of servers used in a cloud computing service.

However, such a technology related to the conventional cloud computing service is merely interested in the timely generation of reports associated with servers rather than storage, and does not present detailed technology for optimizing the content and APIs depending on the additional installation of cloud storage.

Therefore, to optimize the content and APIs depending on the additional installation of cloud storage, urgently required is a new cloud storage management technology that collects distributed content segments of the same uploader using uploader-based identifiers of content, and aligns and moves large-capacity content of a heavy uploader and frequently accessed temporary log files or the like to a storage suitable for the use purpose thereof.

DISCLOSURE

Technical Problem

An object of the present invention is to abstract storage APIs depending on the additional installation of cloud storage into a broker API and to provide the broker API to a user, thus allowing the user to more conveniently access content using only the broker API without having to individually use APIs corresponding to respective cloud storages.

Another object of the present invention is to more promptly provide the content of the same uploader by collecting the distributed content segments of the same uploader using the uploader-based identifiers of content.

A further object of the present invention is to more efficiently manage the capacity of storage by aligning and moving the large-capacity content of a heavy uploader to large-capacity-type cloud storage.

Yet another object of the present invention is to further lengthen the lifespan of normal-type cloud storage by reducing the number of accesses to the normal-type cloud storage in such a way as to align and move frequently accessed temporary log files to high-performance-type cloud storage.

Technical Solution

A cloud storage management apparatus according to the present invention to accomplish the above objects includes a content alignment unit for transmitting a movement signal to a cloud storage, and aligning and moving pieces of content recorded in the cloud storage; and a broker Application Programming Interface (API) unit for abstracting a storage API corresponding to a type of cloud storage into a broker API using an API mapping table, and providing the content to a terminal device using the broker API.

The broker API provision unit may be configured to, when the cloud storage is an additionally installed cloud storage, determine whether the additionally installed cloud storage is of a new type, and if it is determined that the additionally installed cloud storage is of the new type, add a new storage API corresponding to the new type to the API mapping table, and abstract the new storage API into the broker API.

The content alignment unit may be configured to, when the cloud storage is an additionally installed cloud storage, align and move content recorded in an existing cloud storage to the additionally installed cloud storage.

The content alignment unit may include an identifier storage unit for storing identifiers corresponding to the pieces of content; a movement determination unit for, when the content corresponds to one or more of a distributed recording state, large-capacity content, and a log file, determining the content to be a movement target; and a signal transmission unit for, when the content is the movement target, transmitting a movement signal to the cloud storage so that the content is moved to a destination storage.

The movement determination unit may be configured to, when the number of cloud storages, in which pieces of content corresponding to each identifier are distributed and recorded, exceeds a preset allowable number of storages, determine that the content is in a distributed recording state.

The content alignment unit may further include a storage selection unit for selecting the destination storage depending on whether the content corresponds to any one of a distributed recording state, large-capacity content, and a log file.

The storage selection unit may select destination storages so that, when the content is in the distributed recording state, the number of destination storages does not exceed the allowable number of storages.

Each identifier may be an uploader identifier corresponding to a content uploader that has uploaded the content.

The movement determination unit may be configured to, when a capacity of the content exceeds a preset allowable capacity, determine that the content is large-capacity content.

The movement determination unit may be configured to, when content recorded in the cloud storage is partitioned into a plurality of content segments and a sum of capacities of the content segments exceeds a preset reference capacity, determine that the content is large-capacity content.

The storage selection unit may be configured to, when the content is large-capacity content, select a cloud storage, a capacity of which exceeds a preset reference capacity, as the destination storage.

The storage selection unit may be configured to, when the content is a log file, select a cloud storage, performance of which exceeds preset reference performance, as the destination storage.

Further, a cloud storage management method according to the present invention includes transmitting a movement signal to a cloud storage, and aligning and moving pieces of content recorded in the cloud storage; and abstracting a storage Application Programming Interface (API) corresponding to a type of cloud storage into a broker API using an API mapping table, and providing the content to a terminal device using the broker API.

Providing the content to the terminal device using the broker API may include when the cloud storage is an additionally installed cloud storage, determining whether the additionally installed cloud storage is of a new type, and if it is determined that the additionally installed cloud storage is of the new type, adding a new storage API corresponding to the new type to the API mapping table, and abstracting the new storage API into the broker API.

Aligning and moving the content may include, when the cloud storage is an additionally installed cloud storage, aligning and moving content recorded in an existing cloud storage to the additionally installed cloud storage; storing identifiers corresponding to pieces of content; when the content corresponds to one or more of a distributed recording state, large-capacity content, and a log file, determining that the content is a movement target; and when the content is the movement target, transmitting a movement signal to a storage group so that the content is moved to a destination storage.

Determining whether the content is the movement target may include when the number of cloud storages, in which pieces of content corresponding to each identifier are distributed and recorded, exceeds a preset allowable number of storages, determining that the content is in a distributed recording state.

Aligning and moving the content may include selecting destination storages so that, when the content is the movement target, the number of destination storages does not exceed an allowable number of storages.

Each identifier may be an uploader identifier corresponding to a content uploader that has uploaded the content.

In addition, a cloud storage management system according to the present invention includes a cloud storage for recording pieces of content; and a management server for transmitting a movement signal to the cloud storage, aligning and moving the pieces of content, abstracting a storage Application Programming Interface (API) corresponding to a type of cloud storage into a broker API using an API mapping table, and providing the content to a terminal device using the broker API.

Advantageous Effects

In accordance with the present invention, the problem with the limitation of functions depending on the additional installation of cloud storage may be solved, thus enabling the storage to be more efficiently used.

Further, the present invention abstracts storage APIs depending on the additional installation of cloud storage into a broker API and provides the broker API to a user, thus allowing the user to more conveniently access content using only the broker API without having to individually use APIs corresponding to respective cloud storages.

Furthermore, the present invention more promptly provides the content of the same uploader by collecting the distributed content segments of the same uploader using the uploader-based identifiers of content.

Furthermore, the present invention more efficiently manages the capacity of storage by aligning and moving the large-capacity content of a heavy uploader to large-capacity-type cloud storage.

In addition, the present invention further lengthens the lifespan of normal-type cloud storage by reducing the number of accesses to the normal-type cloud storage in such a way as to align and move frequently accessed temporary log files to high-performance-type cloud storage.

DESCRIPTION OF DRAWINGS

FIG. 2 is a diagram showing an example of an API mapping table according to the present invention;

BEST MODE

Figure 1:
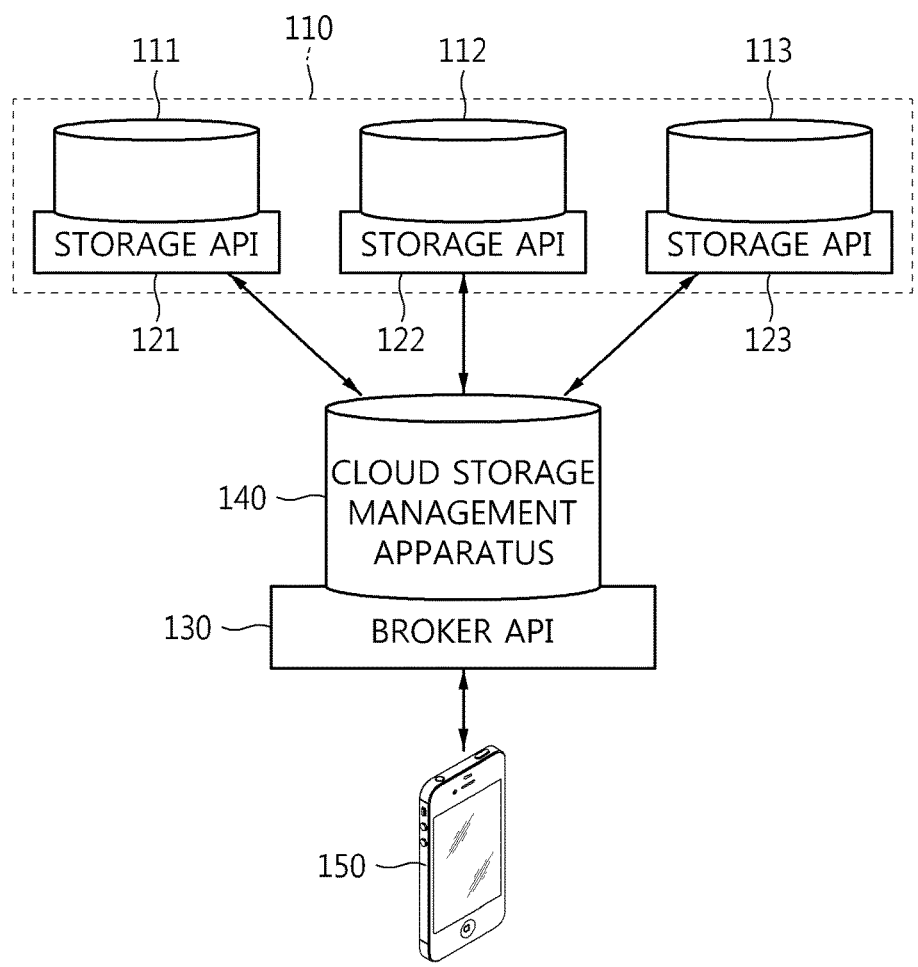
FIG. 1 is a block diagram showing a cloud storage management system according to an embodiment of the present invention.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

Hereinafter, preferred embodiments of the present invention will be described in detail with reference to the attached drawings.

FIG. 1 is a block diagram showing a cloud storage management system according to an embodiment of the present invention.

Referring to FIG. 1, a system to which a cloud storage management apparatus according to the present invention is applied includes a cloud storage group 110, a cloud storage management apparatus 140, and a terminal device 150.

The cloud storage group 110 includes a plurality of cloud storages 111 to 113.

Here, in each of the cloud storages 111 to 113, content may be recorded.

Here, each of the cloud storages 111 to 113 may be a cloud storage classified as a normal type, a high-performance type, a large-capacity type, or the like.

The high-performance-type cloud storage may be a storage having a read and write speed higher than that of the normal-type cloud storage.

The high-performance type cloud storage may have better storage stability than the normal-type cloud storage.

The large-capacity-type cloud storage may be a storage having a capacity larger than that of the normal-type cloud storage.

Further, the cloud storage 111 may be a storage corresponding to an existing device, and the cloud storage 112 and the cloud storage 113 may be additionally installed cloud storages.

The cloud storage group 110 may provide storage Application Programming Interfaces (APIs) 121 to 123 corresponding to the respective cloud storage types of the cloud storages 111 to 113.

The storage APIs 121 to 123 may be APIs for accessing pieces of content.

Here, the storage API 121 may be an API for accessing the content recorded in the cloud storage 111.

The storage API 122 may be an API for accessing the content recorded in the cloud storage 112.

The storage API 123 may be an API for accessing the content recorded in the cloud storage 113.

Here, the storage APIs 121 to 123 may be different from each other depending on the types of the corresponding cloud storages 111 to 113.

The storage API 121 may be an API corresponding to the normal type.

The storage API 122 may be an API corresponding to the high-performance type.

The storage API 123 may be an API corresponding to the large-capacity type.

The cloud storage management apparatus 140 may transmit a movement signal to the cloud storage 111 and align and move the content recorded in the cloud storage 111.

Here, when the cloud storage 112 is an additionally installed cloud storage, the cloud storage management apparatus 140 may align and move pieces of content recorded in the existing cloud storage 111 to the additionally installed cloud storage 112.

The cloud storage management apparatus 140 may store identifiers corresponding to the pieces of content recorded in the cloud storage 111.

Such an identifier may be an uploader identifier corresponding to a content uploader that has uploaded the content.

Here, the cloud storage management apparatus 140 may determine, using the identifier, whether the content is a movement target.

In this regard, the cloud storage management apparatus 140 may determine that the content is the movement target if the content corresponds to one or more of a distributed recording state, large-capacity content, and a log file.

If the number of cloud storages, in which pieces of content corresponding to each identifier are distributed and recorded, is greater than the preset allowable number of storages, the cloud storage management apparatus 140 may determine that the content is in a distributed recording state.

If the capacity of content exceeds a preset allowable capacity, the cloud storage management apparatus 140 may determine that the content is large-capacity content.

If the content recorded in the corresponding cloud storage is partitioned into a plurality of content segments and then the sum of the capacities of the content segments exceeds a preset reference capacity, the cloud storage management apparatus 140 may determine that the content is large-capacity content.

When the content is a movement target, the cloud storage management apparatus 140 may transmit a movement signal to the cloud storage group 110 so that the content is moved to a destination storage.

The cloud storage management apparatus 140 may select a destination storage depending on whether the content corresponds to any one of a distributed recording state, large-capacity content, and a log file.

Here, the cloud storage management apparatus 140 may select destination storages so that, when the content is in the distributed recording state, the number of destination storages does not exceed the allowable number of storages.

Here, when the content is large-capacity content, the cloud storage management apparatus 140 may select a cloud storage, the capacity of which exceeds a preset reference capacity, as the destination storage.

Here, when the content is a log file, the cloud storage management apparatus 140 may select a cloud storage, the performance of which exceeds preset reference performance, as the destination storage.

Meanwhile, the cloud storage management apparatus 140 abstracts the storage API 121 corresponding to the type of cloud storage 111 into a broker API 130 using an API mapping table, and may provide the content to a terminal device using the broker API 130.

The broker API 130 may include a plurality of broker methods.

Each of the storage APIs 121 to 123 may include a plurality of storage methods.

A correspondence relationship between the broker methods and the storage methods may be a relationship in which a single broker method corresponds to a single storage method.

The broker methods and the storage methods may have a one-to-one correspondence relationship.

The correspondence relationship between the broker methods and the storage methods may be a relationship in which a single broker method corresponds to a plurality of storage methods.

Here, the broker method and storage methods may have a one-to-many correspondence relationship.

In this way, the user may access pieces of content using the broker API 130 abstracted by the cloud storage management apparatus 140, without directly utilizing the storage APIs 121 to 123.

As described above, the cloud storage management apparatus 140 may abstract the storage API 121 into the broker API 130 using the mapping table that includes information about the correspondence relationship between the methods of the broker API 130 and the methods of the storage API 121.

Further, the cloud storage management apparatus 140 may abstract the storage identification (ID) of content into a broker ID corresponding thereto.

Here, the broker ID and the storage ID may have a one-to-one correspondence relationship.

In this way, the user may access pieces of content by calling the broker ID abstracted by the cloud storage management apparatus 140.

In this way, the cloud storage management apparatus 140 may provide the function of a broker server that abstracts the storage API 121 into the broker API 130 and provides the broker API 130 to the terminal device.

The terminal device 150 may include a Personal Computer (PC), a notebook computer, a mobile phone, a tablet PC, a navigation device, a smart phone, a Personal Digital Assistant (PDA), a Portable Multimedia Player (PMP), or a digital broadcast receiver such as a Digital Video Broadcasting (DVB) terminal.

Here, the terminal device 150 and the cloud storage management apparatus 140 may transfer content over a network.

Here, the network is a concept including all of networks that are conventionally used and networks that may be developed in the future. For example, the network may include an Internet Protocol (IP) network for providing a large-capacity data transmission/reception service and a seamless data service via an Internet Protocol (IP), an All-IP network having an IP network structure in which different networks are integrated with each other based on IP, etc., and may be implemented by combining one or more of a wired network, a third generation (3G) mobile communication network including a Wireless Broadband (Wibro) network and a Wideband Code Division Multiple Access (WCDMA) network, a 3.5-th generation (3.5G) mobile communication network including a High Speed Downlink Packet Access (HSDPA) network and a Long-Term Evolution (LTE) network, a fourth generation (4G) mobile communication network including an LTE advanced network, a satellite communication network, and a Wi-Fi network.

FIG. 2 is a diagram showing an example of an API mapping table according to the present invention.

Referring to FIG. 2, it can be seen that a broker API 130 corresponds to storage APIs 121 to 123 according to the present invention.

That is, it can be seen that the broker API 130 and the storage APIs 121 to 123 have a one-to-one correspondence or one-to-many correspondence relationship.

Here, the broker API 130 may include a plurality of broker methods B1 to B5.

The storage API 121 may be an API corresponding to a normal type.

The storage API 122 may be an API corresponding to a high-performance type.

The storage API 123 may be an API corresponding to a large-capacity type.

In this case, the storage API 121 may include a plurality of storage methods T1S1 to T1S3.

The storage API 122 may include a plurality of storage methods T2S1 to T2S3.

The storage API 123 may include a plurality of storage methods T3S1 to T3S3.

The broker methods and the storage methods may have a one-to-one correspondence relationship.

For example, it can be seen from FIG. 2 that the broker method B4 and the storage method T2S2 may have a one-to-one correspondence relationship.

For example, it can be seen from FIG. 2 that the broker method B5 and the storage method T3S1 may have a one-to-one correspondence relationship.

Here, each broker method and the storage methods may have a one-to-many correspondence relationship.

That is, a single broker method and two or more storage methods may have a correspondence relationship.

For example, it can be seen from FIG. 2 that the broker method B1 and the storage methods T1S1 and T2S1 may have a one-to-many correspondence relationship.

For example, referring to FIG. 2, the broker method B2 and the storage methods T1S2 and T3S2 may have a one-to-many correspondence relationship.

For example, referring to FIG. 2, the broker method B3 and the storage methods T1S3, T2S3, and T3S3 may have a one-to-many correspondence relationship.

In this way, the broker methods and the storage methods may have a one-to-one or one-to-many correspondence relationship.

Here, the cloud storage management apparatus 140 may abstract the storage APIs 121 to 123 into the broker API 130 using the correspondence relationship.

When a certain cloud storage is an additionally installed cloud storage 112, the cloud storage management apparatus 140 may determine whether the additionally installed cloud storage 112 is of a new type, and if it is determined that the additionally installed cloud storage is of a new type, may add a new storage API corresponding to the new type to the API mapping table and abstract the new storage API into the broker API.

In this way, the user may access the pieces of content using the broker API 130 abstracted by the cloud storage management apparatus 140, without directly utilizing the storage APIs 121 to 123.

Figure 3:
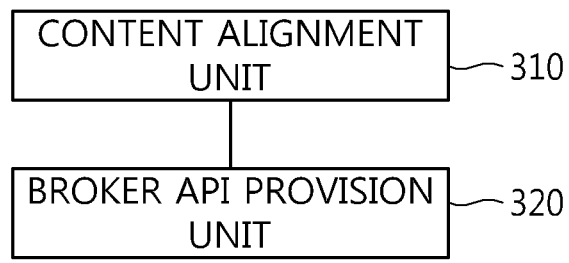
FIG. 3 is a block diagram showing an example of a cloud storage management apparatus shown in FIG. 1.

FIG. 3 is a block diagram showing an example of the cloud storage management apparatus shown in FIG. 1.

Referring to FIG. 3, the cloud storage 140 shown in FIG. 1 includes a content alignment unit 310 and a broker API provision unit 320.

The content alignment unit 310 aligns and moves pieces of content recorded in each cloud storage.

The content alignment unit 310 may store identifiers corresponding to the pieces of content recorded in the cloud storage 111.

Here, such an identifier may be an uploader identifier corresponding to a content uploader that has uploaded the content.

The content alignment unit 310 may determine using the identifiers whether the content is a movement target.

Here, when the content corresponds to one or more of a distributed recording state, large-capacity content, and a log file, the content alignment unit 310 may determine that the content is a movement target.

When the number of cloud storages, in which pieces of content corresponding to each identifier are distributed and recorded, exceeds the preset allowable number of storages, the content alignment unit 310 may determine that the content is in a distributed recording state.

When the capacity of the content exceeds a preset allowable capacity, the content alignment unit 310 may determine that the content is large-capacity content.

Here, when the content recorded in the cloud storage is partitioned into a plurality of content segments, and the sum of capacities of the content segments exceeds a preset reference capacity, the content alignment unit 310 may determine that the content is large-capacity content.

Here, when the content is the movement target, the content alignment unit 310 may transmit a movement signal to the cloud storage group 110 so that the content is moved to a destination storage.

The content alignment unit 310 may select a destination storage depending on whether the content corresponds to any one of a distributed recording state, large-capacity content, and a log file.

When content is in the distributed recording state, the content alignment unit 310 may select destination storages so that the number of destination storages does not exceed the allowable number of storages.

Here, when content is large-capacity content, the content alignment unit 310 may select a cloud storage, the capacity of which exceeds a preset reference capacity, as the destination storage.

When content is a log file, the content alignment unit 310 may select a cloud storage, the performance of which exceeds preset reference performance, as the destination storage.

The broker API provision unit 320 may abstract the storage API 121 corresponding to the type of cloud storage 111 into a broker API 130 using an API mapping table and provides the content to a terminal device using the broker API 130.

Here, the broker API 130 may include a plurality of broker methods B1 to B5.

Here, each of the storage APIs 121 to 123 may include a plurality of storage methods T1S1 to T1S3.

The broker methods and the storage methods may have a one-to-one or one-to-many correspondence relationship.

In this way, the user may access pieces of content using the broker API 130 abstracted by the broker API provision unit 320 without directly utilizing the storage APIs 121 to 123.

The broker API provision unit 320 may abstract the storage API 121 into the broker API 130 using a mapping table that includes information about the correspondence relationship between the methods of the broker API 130 and the methods of the storage API 121.

Further, the broker API provision unit 320 may abstract the storage ID of the content into the broker ID corresponding thereto.

The broker ID and the storage ID may have a one-to-one correspondence relationship.

In this way, the user may access the pieces of content by calling the broker ID abstracted by the broker API provision unit 320.

In this way, the broker API provision unit 320 may provide the function of a broker server that abstracts the storage API 121 into the broker API 130 and provides the broker API 130 to the terminal device.

Figure 4:
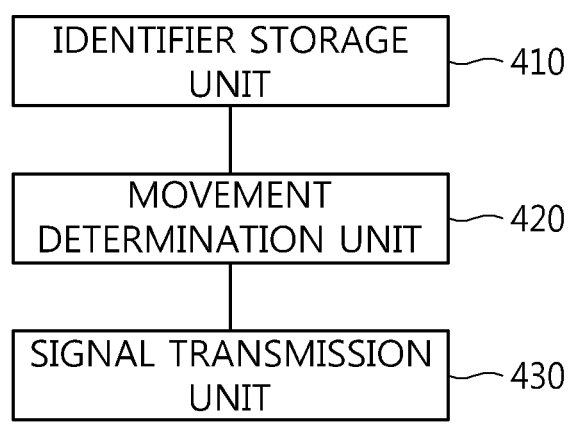
FIG. 4 is a block diagram showing an example of a content alignment unit shown in FIG. 3.

FIG. 4 is a block diagram showing an example of the content alignment unit shown in FIG. 3.

Referring to FIG. 4, the content alignment unit 310 shown in FIG. 3 includes an identifier storage unit 410, a movement determination unit 420, and a signal transmission unit 430.

The identifier storage unit 410 stores identifiers corresponding to pieces of content recorded in the cloud storage 111.

Here, each identifier may be an uploader identifier corresponding to a content uploader that has uploaded the content.

For example, identifier A may be an uploader identifier corresponding to a first content uploader, identifier B may be an uploader identifier corresponding to a second content uploader, and identifier C may be an uploader identifier corresponding to a third content uploader.

The movement determination unit 420 determines using the identifiers whether certain content is a movement target.

When the content corresponds to one or more of a distributed recording state, large-capacity content, and a log file, the movement determination unit 420 may determine that the content is a movement target.

In this case, when the number of cloud storages, in which pieces of content corresponding to each identifier are distributed and recorded, exceeds the preset allowable number of storages, the movement determination unit 420 may determine that the content is in a distributed recording state.

For example, when content A is distributed to and recorded in more than two cloud storages, the movement determination unit 420 may determine that the content A is in a distributed recording state.

For example, when content A is distributed to and recorded in the cloud storage 111, the cloud storage 112, and the cloud storage 113, and the allowable number of storages is 2, the movement determination unit 420 may determine that the content A is in a distributed recording state.

For example, when the number of cloud storages, in which content B is distributed and recorded, does not exceed 2, the movement determination unit 420 may determine that the content B is not in a distributed recording state.

For example, when the content B is distributed to and recorded in the cloud storage 112 and the cloud storage 113, and the allowable number of storages is 2, the movement determination unit 420 may determine that the content B is not in a distributed recording state.

In this case, when the capacity of content exceeds the preset allowable capacity, the movement determination unit 420 may determine that the content is large-capacity content.

For example, when the capacity of content C is 30 gigabytes (GB), and the allowable capacity is 20 GB, the movement determination unit 420 may determine that the content C is large-capacity content.

When content recorded in the cloud storage is partitioned into a plurality of content segments, and the sum of capacities of the content segments exceeds a preset reference capacity, the movement determination unit 420 may determine that the content is large-capacity content.

For example, in the case where content C is partitioned into content segments C1 and C2 and the content segments are recorded in the cloud storage 112, when the capacity of the content segment C1 is 15 GB, the capacity of the content segment C2 is 15 GB, and the allowable capacity is 20 GB, the movement determination unit 420 may determine that the content C is large-capacity content because the sum of the capacities of the content segments C1 and C2 is 30 GB, which exceeds the allowable capacity.

For example, in the case where content C is partitioned into content segment C1 and content segment C2, and the content segments are recorded in the cloud storage 112, when the capacity of the content segment C1 is 5 GB, the capacity of the content segment C2 is 5 GB, and the allowable capacity is 20 GB, the movement determination unit 420 may determine that the content C is not large-capacity content because the sum of the capacities of the content segments C1 and C2 is 10 GB, which does not exceed the allowable capacity.

When the content is the movement target, the signal transmission unit 430 transmits a movement signal to the cloud storage group 110 so that the content is moved to a destination storage.

Although not shown in FIG. 4, the content alignment unit 310 may further include a storage selection unit for selecting the destination storage depending on whether the content corresponds to any one of a distributed recording state, large-capacity content, and a log file.

Figure 5:
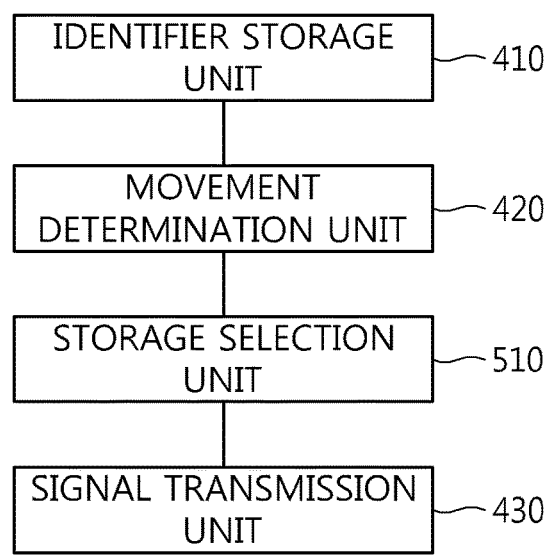
FIG. 5 is a block diagram showing another example of the content alignment unit shown in FIG. 3.

FIG. 5 is a block diagram showing another example of the content alignment unit shown in FIG. 3.

Referring to FIG. 5, the content alignment unit 310 shown in FIG. 3 includes an identifier storage unit 410, a movement determination unit 420, and a signal transmission unit 430, and may further include a storage selection unit 510.

The storage selection unit 510 selects a destination storage depending on whether content corresponds to any one of a distributed recording state, large-capacity content, and a log file.

Here, when content is in the distributed recording state, the storage selection unit 510 may select destination storages so that the number of destination storages does not exceed the allowable number of storages.

For example, when content A is in a distributed recording state, and the allowable number of storages is 2, the storage selection unit 510 may select one storage as a destination storage.

For example, when content A is in a distributed recording state, and the allowable number of storages is 2, the storage selection unit 510 may select the cloud storage 112 as a destination storage.

Here, when content is large-capacity content, the storage selection unit 510 may select a cloud storage, the capacity of which exceeds a preset reference capacity, as a destination storage.

For example, when content C is large-capacity content, and the reference capacity is 2 terabytes (TB), the storage selection unit 510 may select a cloud storage, the capacity of which exceeds 2 TB, as a destination storage.

For example, when content C is large-capacity content, the reference capacity is 2 TB, the capacity of the cloud storage 111 is 1 TB, the capacity of the cloud storage 112 is 3 TB, and the capacity of the cloud storage 113 is 256 GB, the storage selection unit 510 may select the cloud storage 112 as the destination storage.

Here, the cloud storage, the capacity of which exceeds the reference capacity, may be a cloud storage classified as the large-capacity type.

When content is a log file, the storage selection unit 510 may select a cloud storage, the performance of which exceeds preset reference performance, as a destination storage.

For example, when content D is a log file, and the reference performance is a read speed of 200 MB/sec, the storage selection unit 510 may select a cloud storage, the performance of which exceeds a read speed of 200 MB/sec, as a destination storage.

For example, when content D is a log file, reference performance is a read speed of 200 MB/sec, the read speed of the cloud storage 111 is 120 MB/sec, the read speed of the cloud storage 112 is 120 MB/sec, and the read speed of the cloud storage 113 is 740 MB/sec, the storage selection unit 510 may select the cloud storage 113 as the destination storage.

Here, the cloud storage, the performance of which exceeds the reference performance, may be a cloud storage classified as the high-performance type.

When the content is the movement target, the signal transmission unit 430 may transmit a movement signal to the cloud storage group 110 so that the content is moved to the destination storage.

For example, when content A is in a distributed recording state, and the cloud storage 112 is the destination storage, the signal transmission unit 430 may transmit a movement signal to the cloud storage group 110 so that the content A is moved to the cloud storage 112.

For example, when content C is large-capacity content and the cloud storage 113 is the destination storage, the signal transmission unit 430 may transmit a movement signal to the cloud storage group 110 so that the content C is moved to the cloud storage 113.

For example, when content C is large-capacity content and the cloud storage 113 is the destination storage, the signal transmission unit 430 may transmit a movement signal to the cloud storage group 110 so that content segment C1 and content segment C2 are moved to the cloud storage 113.

Here, the cloud storage 113 may be a large-capacity-type cloud storage.

For example, when content D is a log file, and the cloud storage 112 is a destination storage, the signal transmission unit 430 may transmit a movement signal to the cloud storage group 110 so that the content D is moved to the cloud storage 112.

Here, the cloud storage 112 may be a high-performance-type cloud storage.

Figure 6:
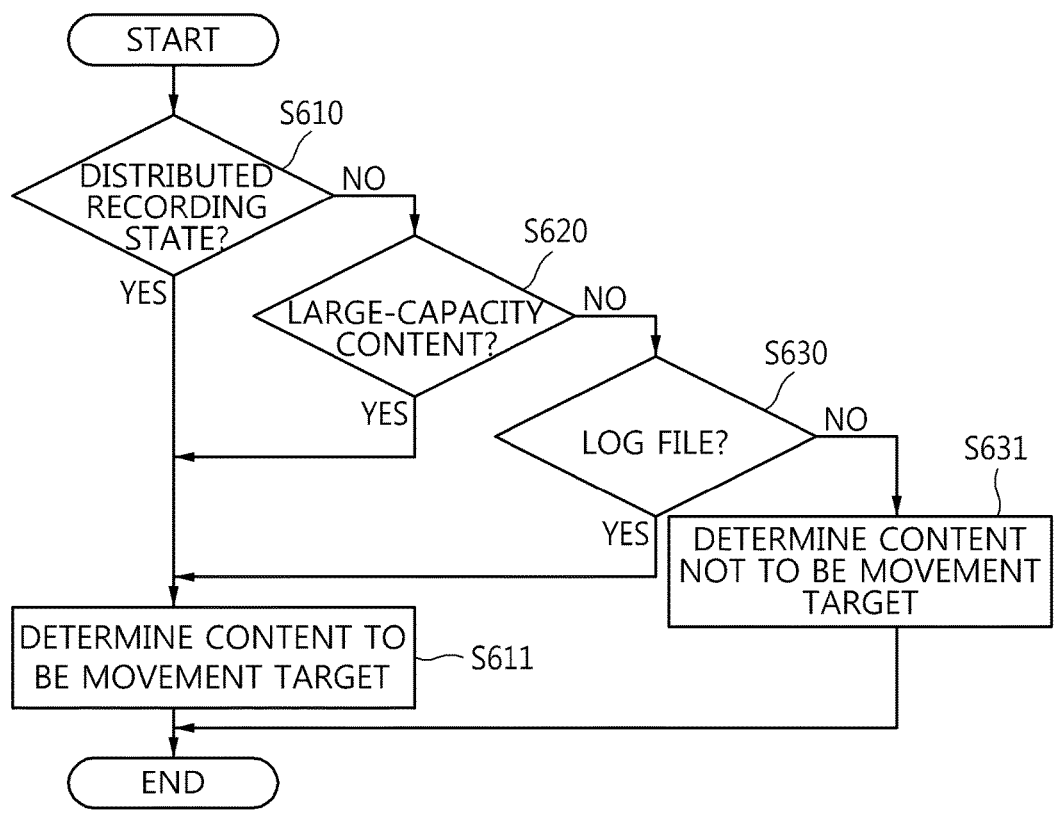
FIG. 6 is an operation flowchart showing an example of the operation of a movement determination unit shown in FIG. 4.

FIG. 6 is an operation flowchart showing an example of the operation of the movement determination unit shown in FIG. 4.

Referring to FIG. 6, the movement determination unit 420 shown in FIG. 4 determines whether content is in a distributed recording state at step S610.

At step S610, when the number of cloud storages, in which pieces of content corresponding to each identifier are distributed and recorded, exceeds the preset allowable number of storages, it may be determined that the content is in a distributed recording state.

For example, at step S610, when content A is distributed to and recorded in more than two cloud storages, it may be determined that the content A is in a distributed recording state.

For example, at step S610, when content A is distributed to and recorded in the cloud storage 111, the cloud storage 112, and the cloud storage 113, and the number of allowable storages is 2, it may be determined that the content A is in a distributed recording state.

At step S610, for example, when the number of cloud storages, in which content B is distributed and recorded, does not exceed 2, it may be determined that the content B is not in a distributed recording state.

At step S610, for example, when content B is distributed to and recorded in the cloud storage 112 and the cloud storage 113, and the allowable number of storages is 2, it may be determined that the content B is not in a distributed recording state.

Here, when the content is in a distributed recording state, the movement determination unit 420 shown in FIG. 4 determines that the content is a movement target at step S611.

For example, at step S611, when the content A is in a distributed recording state, the content A is determined to be the movement target.

Further, when the content is not in a distributed recording state, the movement determination unit 420 shown in FIG. 4 determines whether the content is large-capacity content at step S620.

At step S620, when the capacity of the content exceeds preset allowable capacity, it may be determined that the content is large-capacity content.

For example, at step S620, when the capacity of content C is 30 GB, and the allowable capacity is 20 GB, the content C is determined to be large-capacity content.

Here, at step S620, when content recorded in the cloud storage is partitioned into a plurality of content segments, and the sum of the capacities of the content segments exceeds a preset reference capacity, it may be determined that the content is large-capacity content.

For example, at step S620, in the case where content C is partitioned into content segments C1 and C2 and the content segments are recorded in the cloud storage 112, when the capacity of the content segment C1 is 15 GB, the capacity of the content segment C2 is 15 GB, and the allowable capacity is 20 GB, it may be determined that the content C is large-capacity content because the sum of the capacities of the content segments C1 and C2 is 30 GB, which exceeds the allowable capacity.

For example, at step S620, in the case where content C is partitioned into content segment C1 and content segment C2 and the content segments are recorded in the cloud storage 112, when the capacity of the content segment C1 is 5 GB, the capacity of the content segment C2 is 5 GB, and the allowable capacity is 20 GB, it may be determined that the content C is not large-capacity content because the sum of the capacities of the content segments C1 and C2 is 10 GB, which does not exceed the allowable capacity.

Here, if the content is the large-capacity content, the movement determination unit 420 shown in FIG. 4 determines that the content is a movement target at step S611.

For example, at step S611, when content C is large-capacity content, the content C may be determined to be a movement target.

For example, at step S611, when the content C is large-capacity content, the content C may be determined to be a movement target.

Further, when the content is not large-capacity content, the movement determination unit 420 shown in FIG. 4 determines whether the content is a log file at step S630.

If the content is a log file, the movement determination unit 420 shown in FIG. 4 determines that the content is a movement target at step S611.

For example, at step S611, when content D is a log file, the content D may be determined to be a movement target.

Here, if the content is not a log file, the movement determination unit 420 shown in FIG. 4 determines that the content is not a movement target at step S631.

In this way, when the content corresponds to one or more of a distributed recording state, large-capacity content, and a log file, the movement determination unit 420 shown in FIG. 4 may determine that the content is the movement target.

Figure 7:
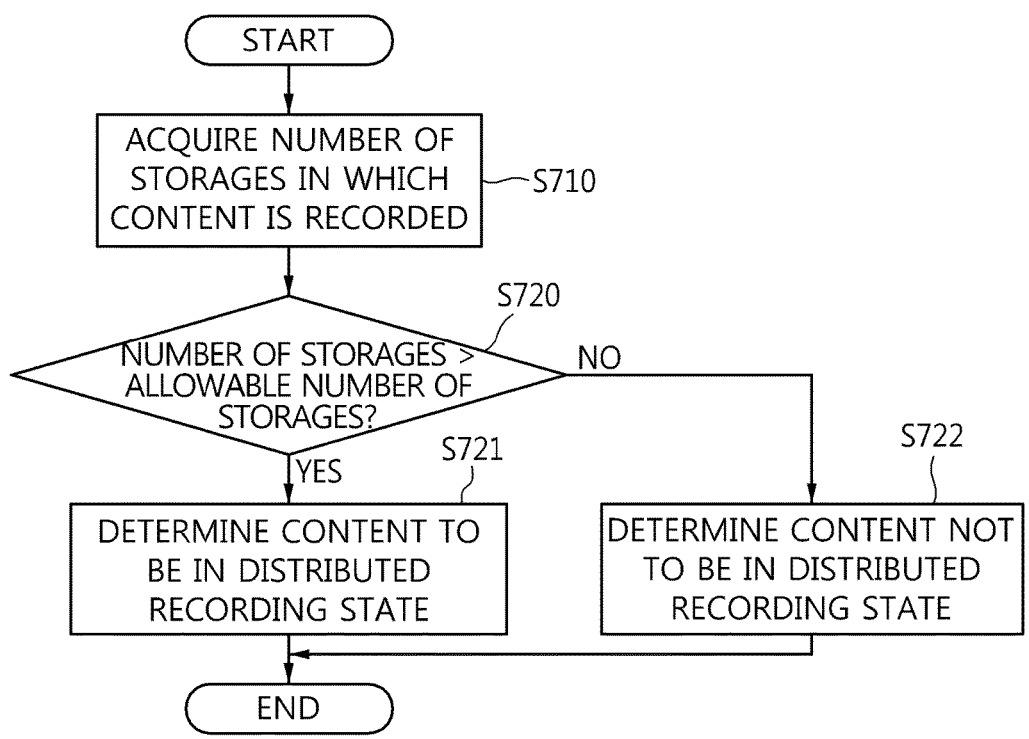
FIG. 7 is an operation flowchart showing another example of the operation of the movement determination unit shown in FIG. 4.

FIG. 7 is an operation flowchart showing another example of the operation of the movement determination unit shown in FIG. 4.

Referring to FIG. 7, the movement determination unit 420 shown in FIG. 4 acquires the number of storages in which pieces of content corresponding to identifiers are recorded at step S710.

For example, at step S710, when pieces of content A corresponding to identifier A are distributed to and recorded in the cloud storage 111, the cloud storage 112, and the cloud storage 113, information indicating that the number of storages in which the content A is recorded is 3 may be acquired.

Further, the movement determination unit 420 shown in FIG. 4 determines whether the number of storages in which the content is recorded exceeds the preset allowable number of storages at step S720.

For example, the allowable number of storages may be 2.

For example, at step S720, when the number of storages in which content A is recorded is 3, and the allowable number of storages is 2, it may be determined that the number of storages in which content A is recorded exceeds the allowable number of storages.

For example, at step S720, when the number of storages in which content B is recorded is 2, and the allowable number of storages is 2, it may be determined that the number of storages in which the content B is recorded does not exceed the allowable number of storages.

Here, when the number of storages in which content is recorded exceeds the allowable number of storages, the movement determination unit 420 shown in FIG. 4 determines that the content is in a distributed recording state at step S721.

For example, at step S721, when the number of storages in which content A is recorded exceeds the allowable number of storages, it may be determined that the content A is in a distributed recording state.

Further, when the number of storages in which the content is recorded does not exceed the allowable number of storages, the movement determination unit 420 shown in FIG. 4 determines that the content is not in a distributed recording state at step S722.

For example, at step S722, when the number of storages in which content B is recorded does not exceed the allowable number of storages, it may be determined that content B is not in a distributed recording state.

Figure 8:
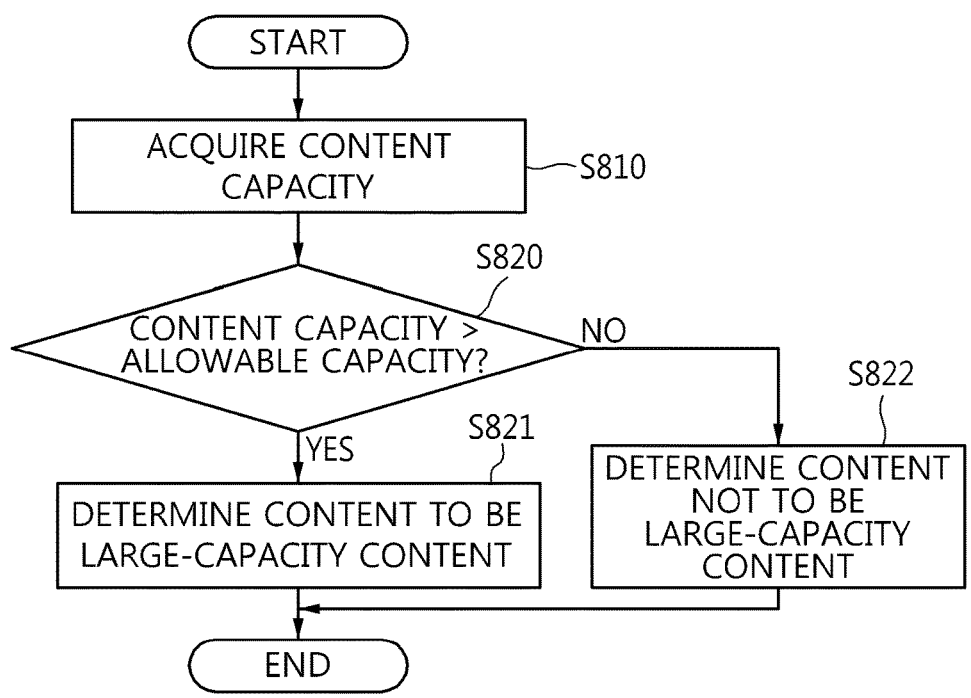
FIG. 8 is an operation flowchart showing a further example of the operation of the movement determination unit shown in FIG. 4.

FIG. 8 is an operation flowchart showing a further embodiment of the operation of the movement determination unit shown in FIG. 4.

Referring to FIG. 8, the movement determination unit 420 shown in FIG. 4 acquires the capacity of content at step S810.

For example, the capacity of content C may be 30 GB.

Further, the movement determination unit 420 shown in FIG. 4 determines whether the capacity of the content exceeds a preset allowable capacity at step S820.

For example, at step S820, when the capacity of content C is 30 GB, and the allowable capacity is 20 GB, it may be determined that the capacity of the content C exceeds the allowable capacity.

For example, at step S820, when the capacity of the content C is 15 GB, and the allowable capacity is 20 GB, it may be determined that the capacity of the content C does not exceed the allowable capacity.

Here, when the capacity of content exceeds the allowable capacity, the movement determination unit 420 shown in FIG. 4 determines that the content is large-capacity content at step S821.

For example, at step S821, when the capacity of content C exceeds the allowable capacity, the content C is determined to be large-capacity content.

Also, when the capacity of the content does not exceed the allowable capacity, the movement determination unit 420 shown in FIG. 4 determines that the content is not large-capacity content at step S822.

For example, at step S822, when the capacity of the content C does not exceed the allowable capacity, it may be determined that the content C is not large-capacity content.

Figure 9:
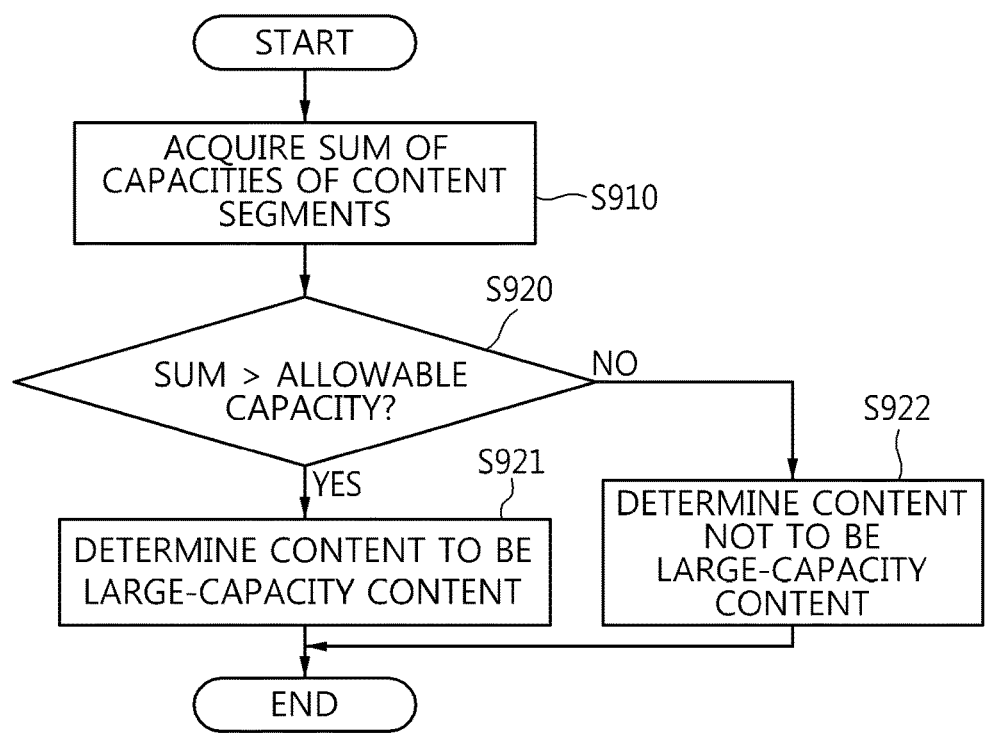
FIG. 9 is an operation flowchart showing yet another example of the operation of the movement determination unit shown in FIG. 4.

FIG. 9 is an operation flowchart showing yet another example of the operation of the movement determination unit shown in FIG. 4.

Referring to FIG. 9, when content recorded in a cloud storage is partitioned into a plurality of content segments, the movement determination unit 420 shown in FIG. 4 acquires the sum of the capacities of the respective segments at step S910.

For example, content C may be partitioned into content segment C1 and content segment C2, and the segments may be recorded in the cloud storage 112, wherein the capacity of each of the content segments C1 and C2 may be 15 GB.

Further, the movement determination unit 420 shown in FIG. 4 determines whether the sum of the capacities of the content segments exceeds a preset allowable capacity at step S920.

For example, at step S920, when the capacity of the content segment C1 is 15 GB, the capacity of the content segment C2 is 15 GB, and the allowable capacity is 20 GB, it may be determined that the sum of the capacities of the content segments C1 and C2 exceeds the allowable capacity.

For example, at step S920, when the capacity of the content segment C1 is 5 GB, the capacity of the content segment C2 is 5 GB, and the allowable capacity is 20 GB, it may be determined that the sum of the capacities of the content segments C1 and C2 does not exceed the allowable capacity.

Here, when the sum of the capacities of the content segments exceeds the allowable capacity, the movement determination unit 420 shown in FIG. 4 determines that the content is large-capacity content at step S921.

For example, at step S921, when the sum of the capacities of the content segments C1 and C2 exceeds the allowable capacity, it may be determined that the content C is large-capacity content.

In contrast, when the sum of the capacities of the content segments does not exceed the allowable capacity, the movement determination unit 420 shown in FIG. 4 determines that the content is not large-capacity content at step S922.

For example, at step S922, when the sum of the capacities of the content segment C1 and the content segment C2 does not exceed the allowable capacity, it may be determined that the content C is not large-capacity content.

Figure 10:
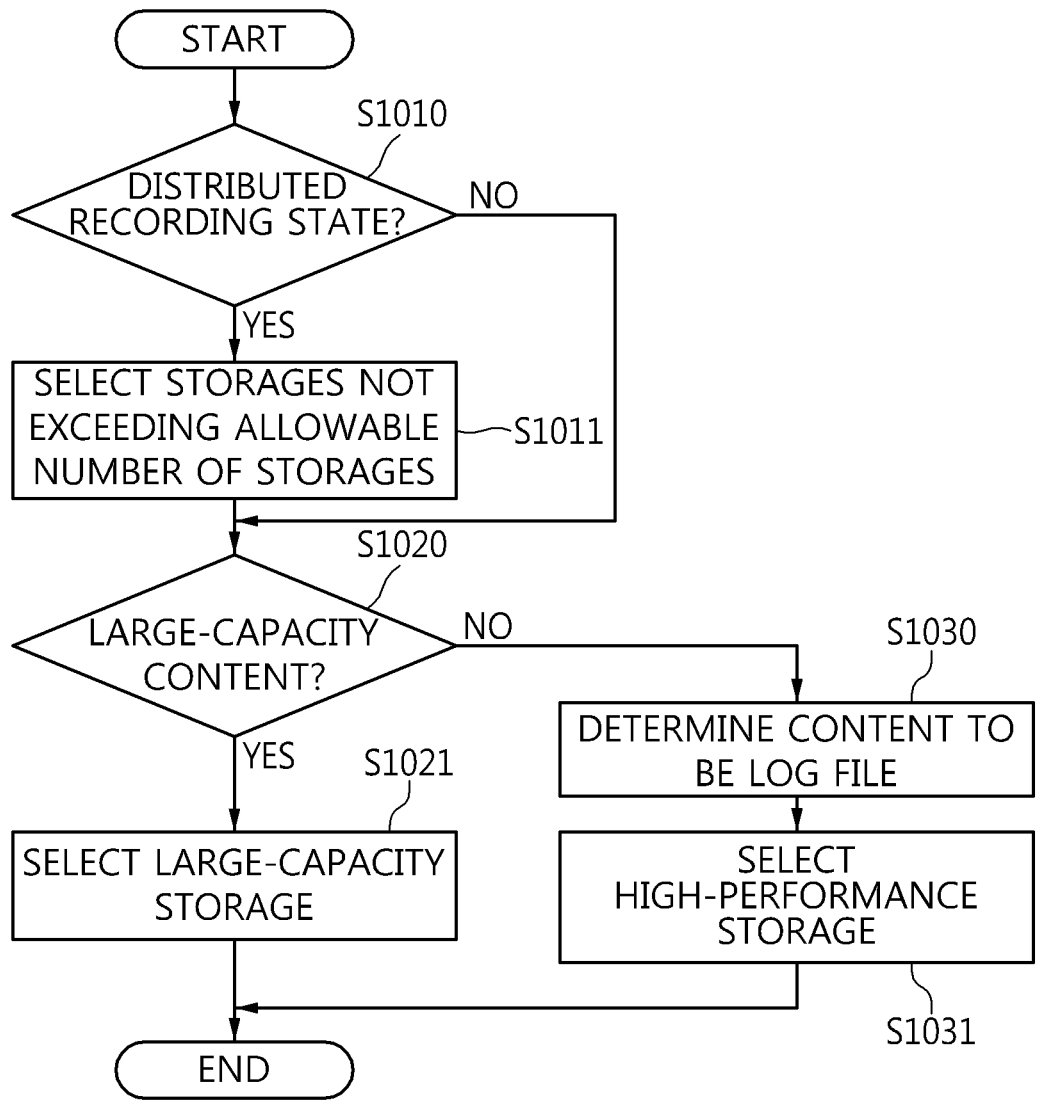
FIG. 10 is an operation flowchart showing an example of the operation of a storage selection unit shown in FIG. 5.

FIG. 10 is an operation flowchart showing an example of the operation of the storage selection unit shown in FIG. 5.

Referring to FIG. 10, the storage selection unit 510 shown in FIG. 5 determines whether content is in a distributed recording state at step S1010.

Here, when the content is in the distributed recording state, the storage selection unit 510 shown in FIG. 5 selects destination storages so that the number of destination storages does not exceed the allowable number of storages at step S1011.

For example, at step S1011, when content A is in a distributed recording state, and the allowable number of storages is 2, one storage may be selected as a destination storage.

For example, at step S1011, when content A is in a distributed recording state and the allowable number of storages is 2, the cloud storage 112 may be selected as a destination storage.

Further, the storage selection unit 510 shown in FIG. 5 determines whether the content is large-capacity content at step S1020.

In this case, if the content is large-capacity content, the storage selection unit 510 shown in FIG. 5 selects a cloud storage, the capacity of which exceeds a preset reference capacity, as a destination storage at step S1021.

For example, at step S1021, when content C is large-capacity content, and the reference capacity is 2 TB, a cloud storage, the capacity of which exceeds 2 TB, may be selected as the destination storage.

For example, at step S1021, when content C is large-capacity content, the reference capacity is 2 TB, the capacity of the cloud storage 111 is 1 TB, the capacity of the cloud storage 112 is 3 TB, and the capacity of the cloud storage 113 is 256 GB, the cloud storage 112 may be selected as the destination storage.

Here, the cloud storage, the capacity of which exceeds the reference capacity, may be a cloud storage classified as the large-capacity type.

Further, when the content is not large-capacity content, the storage selection unit 510 shown in FIG. 5 determines that the content is a log file at step S1030.

That is, since the content has been determined to be the movement target, step S1030 is configured such that, if the content is not large-capacity content, the content may be determined to be a log file.

Further, if the content is the log file, the storage selection unit 510 shown in FIG. 5 selects a cloud storage, the performance of which exceeds preset reference performance, as a destination storage at step S1031.

For example, at step S1031, when content D is a log file and the reference performance is a read speed of 200 MB/sec, a cloud storage, the performance of which exceeds a read speed of 200 MB/sec, may be selected as the destination storage.

For example, at step S1031, when content D is a log file, the reference performance is a read speed of 200 MB/sec, the read speed of the cloud storage 111 is 120 MB/sec, the read speed of the cloud storage 112 is 120 MB/sec, and the read speed of the cloud storage 113 is 740 MB/sec, the cloud storage 113 may be selected as the destination storage.

Here, the cloud storage, the performance of which exceeds the reference performance, may be a cloud storage classified as the high-performance type.

Figure 11:
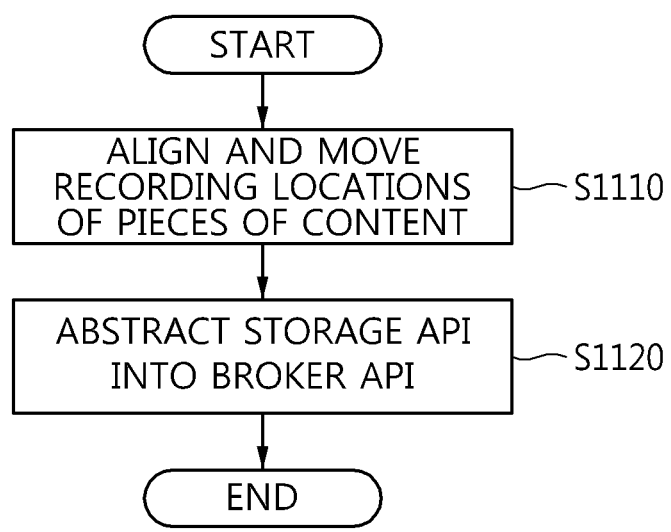
FIG. 11 is an operation flowchart showing a cloud storage management method according to an embodiment of the present invention.

FIG. 11 is an operation flowchart showing a cloud storage management method according to an embodiment of the present invention.

Referring to FIG. 11, in the cloud storage management method according to the embodiment of the present invention, pieces of content recorded in a cloud storage are aligned and moved at step S1110.

Here, at step S1110, identifiers corresponding to the pieces of content recorded in the cloud storage 111 may be stored.

Such an identifier may be an uploader identifier corresponding to a content uploader that has uploaded the content.

At step S1110, it may be determined using the identifier whether the content is a movement target.

At step S1110, when the content corresponds to one or more of a distributed recording state, large-capacity content, and a log file, it may be determined that the content is a movement target.

Here, at step S1110, when the number of cloud storages, in which pieces of content corresponding to the identifier are distributed and recorded, exceeds the preset allowable number of storages, it may be determined that the content is in a distributed recording state.

In this case, at step S1110, if the capacity of the content exceeds a preset allowable capacity, it may be determined that the content is large-capacity content.

At step S1110, when content recorded in the cloud storage is partitioned into a plurality of content segments, and the sum of the capacities of the content segments exceeds a preset reference capacity, it may be determined that the content is large-capacity content.

At step S1110, when the content is the movement target, a movement signal may be transmitted to the cloud storage group 110 so that the content is moved to a destination storage.

At step S1110, the destination storage may be selected depending on whether the content corresponds to any one of a distributed recording state, large-capacity content, and a log file.

At step S1110, when the content is in the distributed recording state, destination storages may be selected so that the number of destination storages does not exceed the allowable number of storages.

At step S1110, when the content is large-capacity content, a cloud storage, the capacity of which exceeds a preset reference capacity, may be selected as a destination storage.

At step S1110, when the content is a log file, a cloud storage, the performance of which exceeds preset reference performance, may be selected as a destination storage.

Further, in the cloud storage management method according to the embodiment of the present invention, the storage API 121 corresponding to the type of cloud storage 111 is abstracted into a broker API 130 using an API mapping table at step S1120.

Here, the broker API 130 may include a plurality of broker methods B1 to B5.

Each of the storage APIs 121 to 123 may include a plurality of storage methods T1S1 to T1S3.

In this case, the broker methods and the storage methods may have a one-to-one or one-to-many correspondence relationship.

In this way, the user may access the pieces of content using the broker API 130 abstracted at step S1120, without directly utilizing the storage APIs 121 to 123.

As described above, at step S1120, the storage API 121 may be abstracted into the broker API 130 using a mapping table that includes information about a correspondence relationship between the methods of the broker API 130 and the methods of the storage API 121.

Further, at step S1120, the storage ID of the content may be abstracted into a broker ID corresponding thereto.

Here, the broker ID and the storage ID may have a one-to-one correspondence relationship.

In this way, the user may access pieces of content by calling the corresponding broker ID abstracted at step S1120.

As described above, at step S1120, the function of a broker server, which abstracts the storage API 121 into the broker API 130 and provides the broker API to a terminal device, may be provided.

Figure 12:
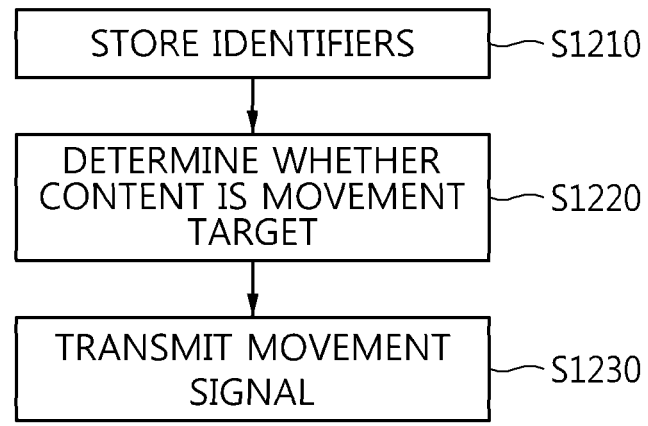
FIG. 12 is an operation flowchart showing an example of a content aligning and moving step shown in FIG. 11.

FIG. 12 is an operation flowchart showing an example of the content aligning and moving step shown in FIG. 11.

Referring to FIG. 12, at the content aligning and moving step S1110 shown in FIG. 11, identifiers corresponding to pieces of content recorded in the cloud storage 111 are stored at step S1210.

Here, such an identifier may be an uploader identifier corresponding to a content uploader that has uploaded the content.

For example, identifier A may be an uploader identifier corresponding to a first content uploader, identifier B may be an uploader identifier corresponding to a second content uploader, and identifier C may be an uploader identifier corresponding to a third content uploader.

Further, at the content aligning and moving step S1110 shown in FIG. 11, it is determined, using the identifiers, whether the content is a movement target at step S1220.

At step S1220, when the content corresponds to one or more of a distributed recording state, large-capacity content, and a log file, the content may be determined to be the movement target.

At step S1220, when the number of cloud storages, in which pieces of content corresponding to each identifier are distributed and recorded, exceeds the preset allowable number of storages, it may be determined that the content is in a distributed recording state.

For example, at step S1220, when content A is distributed to and recorded in more than two cloud storages, it may be determined that the content A is in a distributed recording state.

For example, at step S1220, when the content A is distributed to and recorded in the cloud storage 111, the cloud storage 112, and the cloud storage 113, and the allowable number of storages is 2, it may be determined that the content A is in a distributed recording state.

For example, at step S1220, when the number of cloud storages, in which content B is distributed and recorded, does not exceed 2, it may be determined that the content B is not in a distributed recording state.

For example, at step S1220, when the content B is distributed to and recorded in the cloud storage 112 and the cloud storage 113, and the allowable number of storages is 2, it may be determined that the content B is not in a distributed recording state.

Here, at step S1220, when the capacity of the content exceeds the preset allowable capacity, it may be determined that the content is large-capacity content.

For example, at step S1220, when the capacity of content C is 30 GB, and the allowable capacity is 20 GB, thee content C is determined to be large-capacity content.

At step S1220, in the case where the content recorded in the cloud storage is partitioned into a plurality of content segments, when the sum of the capacities of the content segments exceeds a preset reference capacity, it may be determined that the content is large-capacity content.

For example, at step S1220, in the case where content C is partitioned into content segment C1 and content segment C2 and the content segments are recorded in the cloud storage 112, when the capacity of the content segment C1 is 15 GB, the capacity of the content segment C2 is 15 GB, and the allowable capacity is 20 GB, it may be determined that the content C is large-capacity content because the sum of the capacities of the content segments C1 and C2 is 30 GB, which exceeds the allowable capacity.

For example, at step S1220, in the case where the content C is partitioned into content segment C1 and content segment C2 and the content segments are recorded in the cloud storage 112, when the capacity of the content segment C1 is 5 GB, the capacity of the content segment C2 is 5 GB, and the allowable capacity is 20 GB, it may be determined that the content C is not large-capacity content because the sum of the capacities of the content segments C1 and C2 is 10 GB, which does not exceed the allowable capacity.

Further, at the content aligning and moving step S1110 shown in FIG. 11, when the content is the movement target, a movement signal is transmitted to the cloud storage group 110 so that the content is moved to a destination storage at step S1230.

Although not shown in FIG. 11, step S1110 may further include the step of selecting a destination storage depending on whether the content corresponds to any one of a distributed recording state, large-capacity content, and a log file.

Figure 13:
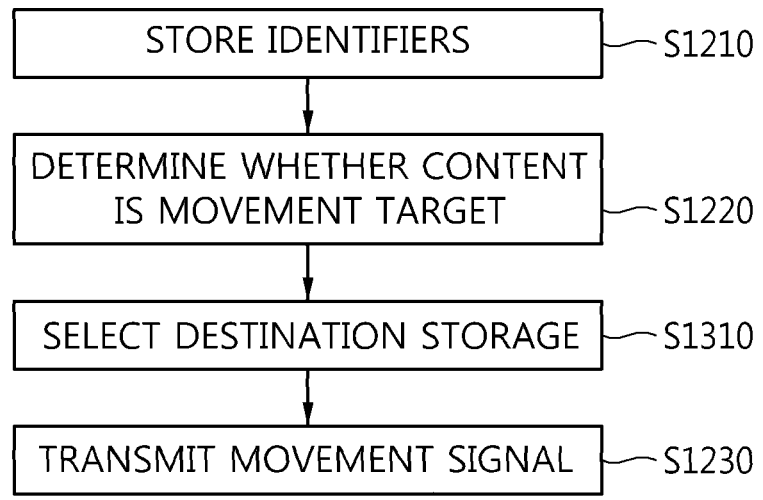
FIG. 13 is an operation flowchart showing another example of the content aligning and moving step shown in FIG. 11.

FIG. 13 is an operation flowchart showing another example of the content aligning and moving step shown in FIG. 11.

Referring to FIG. 13, at the content aligning and moving step shown in FIG. 11, a destination storage is selected depending on whether the content corresponds to any one of a distributed recording state, large-capacity content, and a log file at step S1310.

Here, at step S1310, when the content is in the distributed recording state, destination storages may be selected so that the number of destination storages does not exceed the allowable number of storages.

For example, at step S1310, when content A is in a distributed recording state and the allowable number of storages is 2, one storage may be selected as the destination storage.

For example, at step S1310, when content A is in a distributed recording state and the allowable number of storages is 2, the cloud storage 112 may be selected as the destination storage.

At step S1310, when the content is large-capacity content, a cloud storage, the capacity of which exceeds a preset reference capacity, may be selected as the destination storage.

For example, at step S1310, when content C is large-capacity content and the reference capacity is 2 TB, a cloud storage, the capacity of which exceeds 2 TB, may be selected as the destination storage.

For example, when content C is large-capacity content, the reference capacity is 2 TB, the capacity of the cloud storage 111 is 1 TB, the capacity of the cloud storage 112 is 3 TB, and the capacity of the cloud storage 113 is 256 GB, the cloud storage 112 may be selected as the destination storage.

Here, the cloud storage, the capacity of which exceeds the reference capacity, may be a cloud storage classified as the large-capacity type.

Further, at step S1310, when the content is a log file, a cloud storage, the performance of which exceeds preset reference performance, may be selected as a destination storage.

For example, at step S1310, when content D is a log file and the reference performance is a read speed of 200 MB/sec, a cloud storage, the performance of which exceeds a read speed of 200 MB/sec, may be selected as the destination storage.

For example, at step S1310, when content D is a log file, the reference performance is a read speed of 200 MB/sec, the read speed of the cloud storage 111 120 MB/sec, the read speed of the cloud storage 112 is 120 MB/sec, and the read speed of the cloud storage 113 is 740 MB/sec, the cloud storage 113 may be selected as the destination storage.

Here, the cloud storage, the performance of which exceeds the reference performance, may be a cloud storage classified as the high-performance type.

When the content is the movement target, the signal transmission unit 430 may transmit a movement signal to the cloud storage group 110 so that the content is moved to the destination storage.

For example, when content A is in a distributed recording state, and the cloud storage 112 is the destination storage, the signal transmission unit 430 may transmit a movement signal to the cloud storage group 110 so that the content A is moved to the cloud storage 112.

For example, when content C is large-capacity content and the cloud storage 113 is the destination storage, the signal transmission unit 430 may transmit a movement signal to the cloud storage group 110 so that the content C is moved to the cloud storage 113.

For example, when content C is large-capacity content and the cloud storage 113 is the destination storage, the signal transmission unit 430 may transmit a movement signal to the cloud storage group 110 so that content segment C1 and content segment C2 are moved to the cloud storage 113.

Here, the cloud storage 113 may be a large-capacity-type cloud storage.

For example, when content D is a log file and the cloud storage 112 is a destination storage, the signal transmission unit 430 may transmit a movement signal to the cloud storage group 110 so that the content D is moved to the cloud storage 112.

Here, the cloud storage 112 may be a high-performance-type cloud storage.

Figure 14:
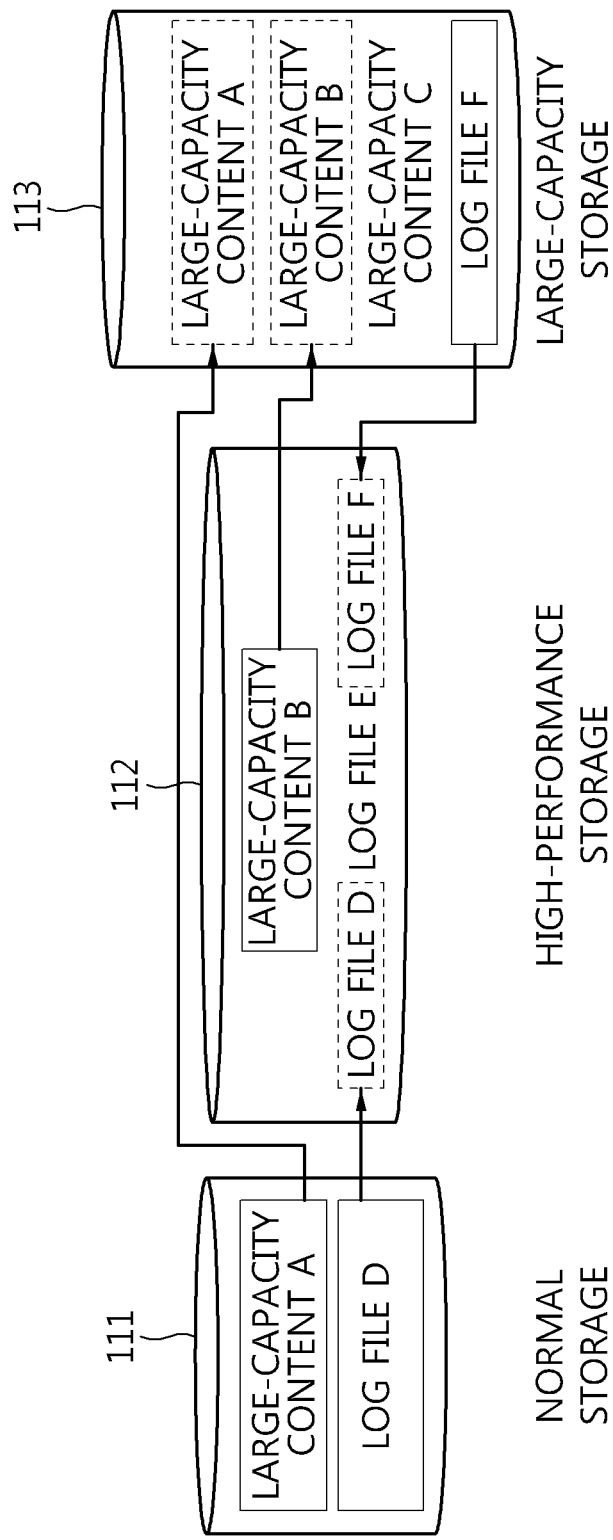
FIG. 14 is a diagram showing an example of content alignment when content recorded in cloud storage is large-capacity content and a log file according to the present invention.

FIG. 14 is a diagram showing an example of content alignment when content recorded in a cloud storage is large-capacity content and a log file according to the present invention.

Referring to FIG. 14, it can be seen that pieces of content are recorded in storages 111 to 113.

In this case, the cloud storage 111, the cloud storage 112, and the cloud storage 113 may be classified as a normal-type cloud storage, a high-performance-type cloud storage, and a large-capacity-type cloud storage, respectively.

Here, large-capacity content A, large-capacity content B, and large-capacity content C may be determined to be large-capacity content by the movement determination unit 420 shown in FIG. 4.

The large-capacity content A may be content corresponding to identifier A, the large-capacity content B may be content corresponding to identifier B, and the large-capacity content C may be content corresponding to identifier C.

In this case, the identifier A may be an uploader identifier corresponding to a first content uploader, the identifier B may be an uploader identifier corresponding to a second content uploader, and the identifier C may be an uploader identifier corresponding to a third content uploader.

Here, log file D, log file E, and log file F may be determined to be the log files by the movement determination unit 420 shown in FIG. 4.

The log file D may be content corresponding to identifier D, the log file E may be content corresponding to identifier E, and the log file F may be content corresponding to identifier F.

The identifier D may be an uploader identifier corresponding to a fourth content uploader, the identifier E may be an uploader identifier corresponding to a fifth content uploader, and the identifier F may be an uploader identifier corresponding to a sixth content uploader.

The storage selection unit 510 shown in FIG. 5 may select the cloud storage 113, classified as a large-capacity type, as the destination storage, for pieces of large-capacity content.

Here, the signal transmission unit 430 shown in FIG. 4 may transmit a movement signal to the cloud storage group 110 so that the large-capacity content is moved to the cloud storage 113.

The cloud storage group 110 may move the large-capacity content to the cloud storage 113 in response to the movement signal.

For example, the cloud storage group 110 may move the large-capacity content A in the cloud storage 111 to the cloud storage 113.

For example, the cloud storage group 110 may move the large-capacity content B in the cloud storage 112 to the cloud storage 113.

Further, the storage selection unit 510 shown in FIG. 5 may select the cloud storage 112, classified as a high-performance type, as the destination storage, for the log files.

Here, the signal transmission unit 430 shown in FIG. 4 may transmit a movement signal to the cloud storage group 110 so that the log files are moved to the cloud storage 112.

Here, the cloud storage group 110 may move the log files to the cloud storage 112 in response to the movement signal.

For example, the cloud storage group 110 may move the log file D in the cloud storage 111 to the cloud storage 112.

For example, the cloud storage group 110 may move the log file F in the cloud storage 113 to the cloud storage 112.

In this way, according to the present invention, when content recorded in the cloud storage is the large-capacity content or the log file, pieces of large-capacity content may be aligned and moved to the large-capacity-type cloud storage, and log files may be aligned and moved to the high-performance-type cloud storage.

Figures 15, 16:
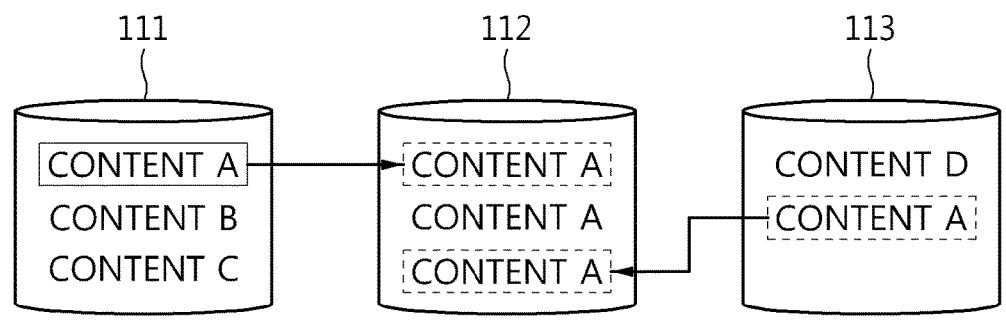
FIG. 15 is a diagram showing an example of content alignment when content is in a distributed recording state according to the present invention.
FIG. 16 is a diagram showing an example of identifier storage according to the present invention.

FIG. 15 is a diagram showing an example of content alignment when content is in a distributed recording state according to the present invention.

Referring to FIG. 15, it can be seen that pieces of content are recorded in cloud storages 111 to 113.

Here, content A, content B, content C, and content D may be pieces of content corresponding to identifier A, identifier B, identifier C, and identifier D, respectively.

Here, the identifier A may be an uploader identifier corresponding to a first content uploader, the identifier B may be an uploader identifier corresponding to a second content uploader, the identifier C may be an uploader identifier corresponding to a third content uploader, and the identifier D may be an uploader identifier corresponding to a fourth content uploader.

When the number of cloud storages, in which pieces of content corresponding to each identifier are distributed and recorded, exceeds the preset allowable number of storages, the movement determination unit 420 shown in FIG. 4 may determine that the content is in a distributed recording state.

For example, when the number of cloud storages, in which pieces of content A corresponding to the identifier A are recorded, is 3, and the allowable number of storages is 2, the movement determination unit 420 may determine that the content A is in a distributed recording state.

In this case, when the content is in the distributed recording state, the storage selection unit 510 shown in FIG. 5 may select destination storages so that the number of destination storages does not exceed the allowable number storages.

For example, when content A is in a distributed recording state and the allowable number of storages is 2, the storage selection unit 510 shown in FIG. 5 may select the cloud storage 112 as the destination storage.

Here, the signal transmission unit 430 shown in FIG. 4 may transmit a movement signal to the cloud storage group 110 so that the content A is moved to the cloud storage 112.

In this case, the cloud storage group 110 may move the pieces of content A to the cloud storage 112 in response to the movement signal.

For example, the cloud storage group 110 may move the content A in the cloud storage 111 to the cloud storage 112.

For example, the cloud storage group 110 may move the content A in the cloud storage 113 to the cloud storage 112.

As described above, in accordance with the present invention, when content recorded in the cloud storage is in a distributed recording state, the content in a distributed recording state may be aligned and moved to a number of cloud storages that do not exceed the allowable number of storages.

FIG. 16 is a diagram showing an example of an identifier storing operation according to the present invention.

Referring to FIG. 16, identifiers corresponding to pieces of content recorded in the cloud storage 111 are stored by the identifier storage unit 410 shown in FIG. 4.

Here, the identifiers may be uploader identifiers corresponding to content uploaders that have uploaded the content.

For example, identifier A may be an uploader identifier corresponding to a first content uploader, identifier B may be an uploader identifier corresponding to a second content uploader, and identifier C may be an uploader identifier corresponding to a third content uploader.

Figure 17:
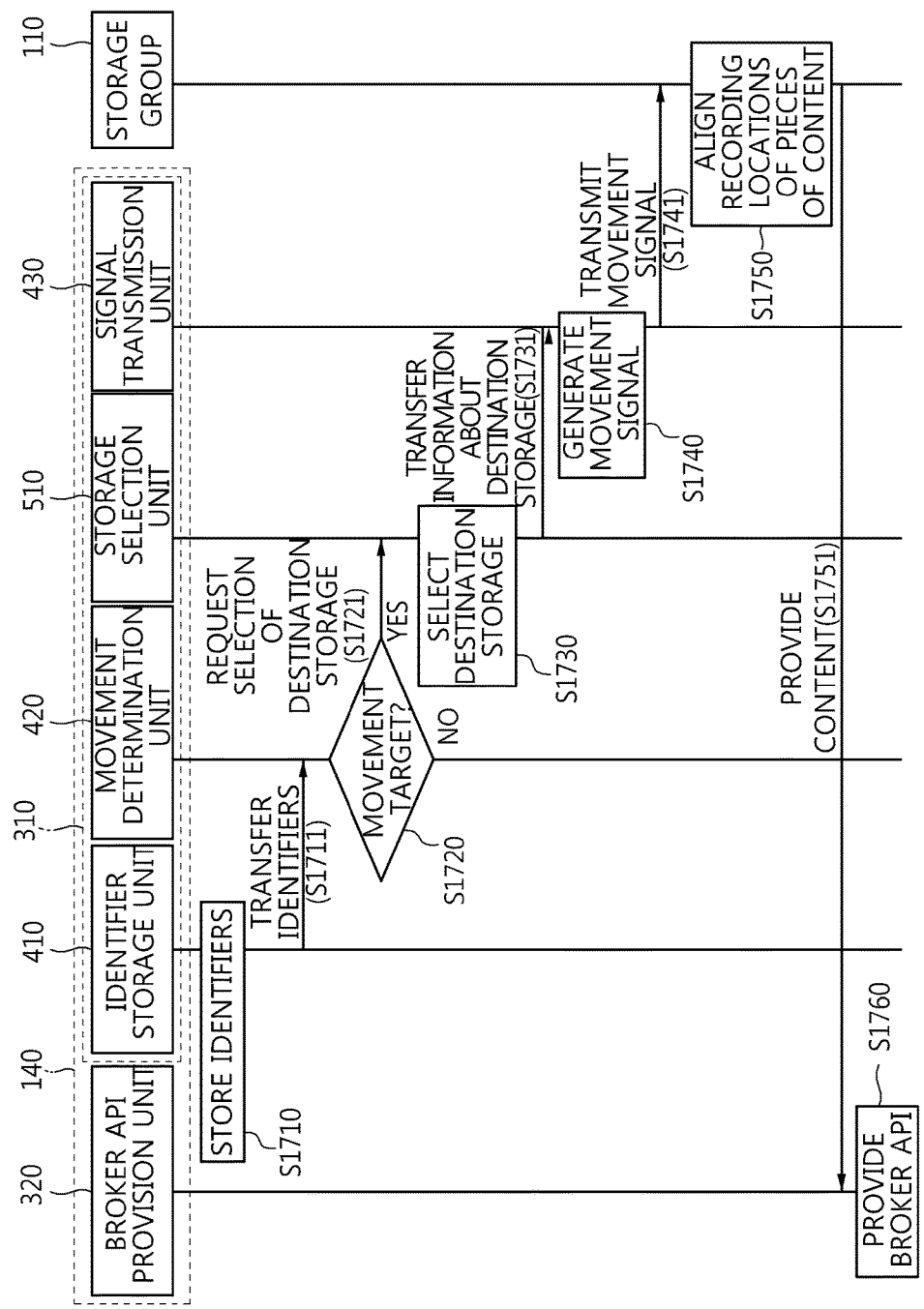
FIG. 17 is an operation flowchart showing the overall procedure of a cloud storage management method according to an embodiment of the present invention.

FIG. 17 is an operation flowchart showing the overall process of a cloud storage management method according to an embodiment of the present invention.

Referring to FIG. 17, the identifier storage unit 410 of the content alignment unit 310 stores identifiers corresponding to pieces of content recorded in the cloud storage 111 at step S1710.

Here, the identifier storage unit 410 transfers the identifiers to the movement determination unit 420 of the content alignment unit 310 at step S1711.

In this case, the movement determination unit 420 determines, using the identifiers, whether the content is a movement target, at step S1720.

If it is determined at step S1720 that the content is a movement target, the movement determination unit 420 requests the storage selection unit 510 of the content alignment unit 310 to select a destination storage at step S1721.

Here, the storage selection unit 510 selects the destination storage depending on whether the content corresponds to any one of a distributed recording state, large-capacity content, and a log file at step S1730.

The storage selection unit 510 transfers information about the destination storage to the signal transmission unit 430 of the content alignment unit 310 at step S1731.

The signal transmission unit 430 transmits a movement signal to the cloud storage group 110 so that the content is moved to the destination storage at step S1741.

The cloud storage group 110 receives the movement signal and aligns and moves pieces of content between the cloud storages 111 to 113 at step S1750.

The cloud storage group 110 provides the content to the broker API provision unit 320 at step S1751.

The broker API provision unit 320 abstracts the storage API 121 corresponding to the type of cloud storage 111 into a broker API 130 using an API mapping table at step S1760.

As described above, the cloud storage management system and the cloud storage management method and apparatus are not limited and applied to the configurations and operations of the above-described embodiments, but all or some of the embodiments may be selectively combined and configured so that the embodiments may be modified in various ways.

INDUSTRIAL APPLICABILITY

In accordance with the present invention, in order to solve the problem with limited functions attributable to the additional installation of cloud storages, pieces of content are aligned in storages depending on the additional installation of cloud storages, and a broker API is updated. In particular, in consideration of the current trend toward an increase in the spread of smart phones and in the number of cloud service users, the utilization of cloud storage management technology according to the present invention may be expected to be increased.

The invention claimed is:

1. A cloud storage management apparatus, comprising:
a content alignment unit configured to:
transmit, to a cloud storage, a movement signal;
align and move pieces of content recorded in the cloud storage; and
align and move content recorded in an existing cloud storage to an additionally installed cloud storage when the cloud storage is the additionally installed cloud storage; and
a broker Application Programming Interface (API) provision unit configured to:
abstract a storage API corresponding to a type of cloud storage into a broker API using an API mapping table;
provide the content to a terminal device using the broker API;
determine whether the additionally installed cloud storage is a new type when the cloud storage is the additionally installed cloud storage;
add a new storage API corresponding to the new type to the API mapping table when it is determined that the additionally installed cloud storage is the new type; and
abstract the new storage API into the broker API,
wherein the content alignment unit comprises:
a movement determination unit configured to:
determine the content to be a movement target when the content corresponds to one or more of a distributed recording state, large-capacity content, and a log file; and
determine that the content is in a distributed recording state when a number of cloud storages exceeds a preset allowable number of storages,
wherein the pieces of content corresponding to each identifier is distributed and recorded in the number of cloud storages;
an identifier storage unit configured to store identifiers corresponding to the pieces of content; and
a signal transmission unit configured to transmit a movement signal to the cloud storage such that the content is moved to a destination storage when the content is the movement target.

2. The cloud storage management apparatus of claim 1, wherein the content alignment unit further comprises a storage selection unit for selecting the destination storage depending on whether the content corresponds to any one of a distributed recording state, large-capacity content, and a log file.

3. The cloud storage management apparatus of claim 1, wherein each identifier is an uploader identifier corresponding to a content uploader that has uploaded the content.

4. The cloud storage management apparatus of claim 1, wherein the movement determination unit is configured to, when a capacity of the content exceeds a preset allowable capacity, determine that the content is large-capacity content.

5. The cloud storage management apparatus of claim 1, wherein the movement determination unit is configured to, when content recorded in the cloud storage is partitioned into a plurality of content segments and a sum of capacities of the content segments exceeds a preset reference capacity, determine that the content is large-capacity content.

6. The cloud storage management apparatus of claim 2, wherein the storage selection unit selects destination storages so that, when the content is in the distributed recording state, a number of destination storages does not exceed the allowable number of storages.

7. The cloud storage management apparatus of claim 2, wherein the storage selection unit is configured to, when the content is large-capacity content, select a cloud storage, a capacity of which exceeds a preset reference capacity, as the destination storage.

8. The cloud storage management apparatus of claim 2, wherein the storage selection unit is configured to, when the content is a log file, select a cloud storage, performance of which exceeds preset reference performance, as the destination storage.

9. A cloud storage management method, comprising:
transmitting, to a cloud storage, a movement signal;
aligning and moving pieces of content recorded in the cloud storage;
abstracting a storage Application Programming Interface (API) corresponding to a type of cloud storage into a broker API using an API mapping table; and
providing the content to a terminal device using the broker API,
wherein aligning and moving the content comprises:
determining that the content is a movement target when the content corresponds to one or more of a distributed recording state, large-capacity content, and a log file;
when the cloud storage is an additionally installed cloud storage, aligning and moving content recorded in an existing cloud storage to the additionally installed cloud storage;
storing identifiers corresponding to the pieces of content; and
when the content is the movement target, transmitting a movement signal to the cloud storage such that the content is moved to a destination storage,
wherein providing the content to the terminal device using the broker API comprises:
when the cloud storage is the additionally installed cloud storage, determining whether the additionally installed cloud storage is a new type;

when it is determined that the additionally installed cloud storage is the new type, adding a new storage API corresponding to the new type to the API mapping table; and abstracting the new storage API into the broker API, and wherein determining that the content is the movement target comprises:

when a number of cloud storage exceeds a preset allowable number of storages, determining that the content is in a distributed recording state, wherein the pieces of content corresponding to each identifier is distributed and recorded in the number of cloud storages.

10. The cloud storage management method of claim 9, wherein aligning and moving the content comprises selecting destination storages so that, when the content is in the distributed recording state, a number of destination storages does not exceed an allowable number of storages.

11. The cloud storage management method of claim 9, wherein each identifier is an uploader identifier corresponding to a content uploader that has uploaded the content.

12. A non-transitory storage medium storing a program for executing a cloud storage management method, comprising:

transmitting, to a cloud storage, a movement signal;

aligning and moving pieces of content recorded in the cloud storage;

abstracting a storage Application Programming Interface (API) corresponding to a type of cloud storage into a broker API using an API mapping table; and providing the content to a terminal device using the broker API, wherein aligning and moving the content comprises:

determining that the content is a movement target when the content corresponds to one or more of a distributed recording state, large-capacity content, and a log file;

when the cloud storage is an additionally installed cloud storage, aligning and moving content recorded in an existing cloud storage to the additionally installed cloud storage;

storing identifiers corresponding to the pieces of content; and when the content is the movement target, transmitting a movement signal to the cloud storage such that the content is moved to a destination storage, wherein providing the content to the terminal device using the broker API comprises:

when the cloud storage is the additionally installed cloud storage, determining whether the additionally installed cloud storage is a new type;

when it is determined that the additionally installed cloud storage is the new type, adding a new storage API corresponding to the new type to the API mapping table; and abstracting the new storage API into the broker API, and wherein determining that the content is the movement target comprises:

when a number of cloud storage exceeds a preset allowable number of storages, determining that the content is in a distributed recording state, wherein the pieces of content corresponding to each identifier is distributed and recorded in the number of cloud storages.

* * * * *